United States Patent
Wu

(10) Patent No.: US 8,189,647 B2
(45) Date of Patent: May 29, 2012

(54) SYSTEMS AND METHODS FOR GENERATING A CODEBOOK TO ENCODE EMBEDDED INFORMATION

(75) Inventor: Huaming Wu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1126 days.

(21) Appl. No.: 12/040,758

(22) Filed: Feb. 29, 2008

(65) Prior Publication Data

US 2009/0219895 A1    Sep. 3, 2009

(51) Int. Cl.
*H04B 1/00* (2006.01)

(52) U.S. Cl. ........ 375/146; 375/141; 375/295; 370/282; 370/320; 370/465

(58) Field of Classification Search .................. 375/140, 375/141, 146, 220, 260, 295; 370/278, 282, 370/319–321, 464, 465, 478–480; 341/50; 710/243, 244, 111–113, 120, 232, 240
See application file for complete search history.

(56) References Cited

U.S. PATENT DOCUMENTS

| | | | |
|---|---|---|---|
| 4,560,976 A * | 12/1985 | Finn ................................. | 341/51 |
| 6,622,145 B2 * | 9/2003 | Kerofsky .............................. | 1/1 |
| 7,088,868 B1 * | 8/2006 | Lidman ........................... | 382/243 |
| 7,376,173 B2 * | 5/2008 | Yedidia et al. ................. | 375/141 |
| 7,843,989 B2 * | 11/2010 | Wu et al. ........................ | 375/146 |
| 2006/0120481 A1 * | 6/2006 | Hong et al. .................... | 375/298 |
| 2006/0176803 A1 | 8/2006 | Oh et al. | |
| 2010/0027697 A1 * | 2/2010 | Malladi et al. ................. | 375/260 |

FOREIGN PATENT DOCUMENTS

| | | |
|---|---|---|
| CN | 1808962 | 7/2006 |
| EP | 1 679 814 | 7/2006 |
| JP | 2006-197597 | 7/2006 |
| KR | 10-2006-0082016 | 7/2006 |
| WO | 2005020519 | 3/2005 |

OTHER PUBLICATIONS

Sharp, "Embedded Coding for PUCCH Transmissions of CQI+ACK/NACK," R1-074656, Nov. 2007.
Texas Instruments, "Embedding ACK/NAK in CQI Reference Signals and Receiver Structures," R1-080190, Jan. 2008.
Motorola, "Uplink transmission of CQI and Ack/Nack," 3GPP TSG RAN1 meeting #49bis, Jun. 2007.
Qualcomm Europe, "Coding structure for CQI+ACK," 3GPP TSG Ran WG1 meeting #49bis, Jun. 2007.
NTT DoCoMo, "LS on target quality on L1/L2 control channel," 3GPP TSG WG1 meeting #48b, Mar. 2007.

* cited by examiner

*Primary Examiner* — Dac Ha
(74) *Attorney, Agent, or Firm* — Austin Rapp & Hardman

(57) ABSTRACT

A method for generating a codebook to encode embedded information is described. A distribution pattern of symbols is determined. A first number of codewords associated with the distribution pattern of symbols is determined. A subset of codewords from the first number of codewords is selected. The subset of codewords is included in the codebook if the subset of codewords satisfies predetermined performance criteria.

34 Claims, 11 Drawing Sheets

SYSTEMS AND METHODS FOR GENERATING A CODEBOOK TO ENCODE EMBEDDED INFORMATION

CROSS-REFERENCE TO RELATED APPLICATIONS

This application is related to U.S. patent application Ser. No. 11/768,789 entitled "Systems and Methods for Embedding a First Signal in the Coding of a Second Signal," which was filed on Jun. 26, 2007.

TECHNICAL FIELD

The present invention relates generally to wireless communications and wireless communications-related technology. More specifically, the present invention relates to systems and methods for generating a codebook to encode embedded information.

BACKGROUND

A wireless communication system typically includes a base station in wireless communication with a plurality of user devices (which may also be referred to as user equipment, mobile stations, subscriber units, access terminals, etc.). The base station transmits data to the user devices over a radio frequency (RF) communication channel. The terms "downlink" and "forward link" refer to transmission from a base station to a user device, while the terms "uplink" and "reverse link" refer to transmission from a user device to a base station.

The 3rd Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering Orthogonal Frequency Division Multiplexing (OFDM) as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), OFDM, Code Division Multiple Access (CDMA), Frequency Division Multiple Access (FDMA), etc.) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc.

Wireless communication systems may include one or more mobile stations and one or more base stations that each transmits a reference signal. In addition, wireless communication systems may transmit control signals such as a channel quality indicator signal (CQI), acknowledgment signals (ACK) and negative acknowledgment signals (NACK). The control signals may be coded jointly or separately. However, performance may diminish and/or the acceptable error rates may increase if the control signals are jointly or separately coded. As such, benefits may be realized embedding one control signal in the coding of a second control signal. Codebook generation schemes do not exist that properly generate a codebook to encode a second control signal with a first control signal embedded in the coding of the second signal. As such, benefits may be realized by providing systems and methods for generating a codebook that can be utilized for embedding one type of information in the coding of another type of information.

DETAILED DESCRIPTION

Figure 1:
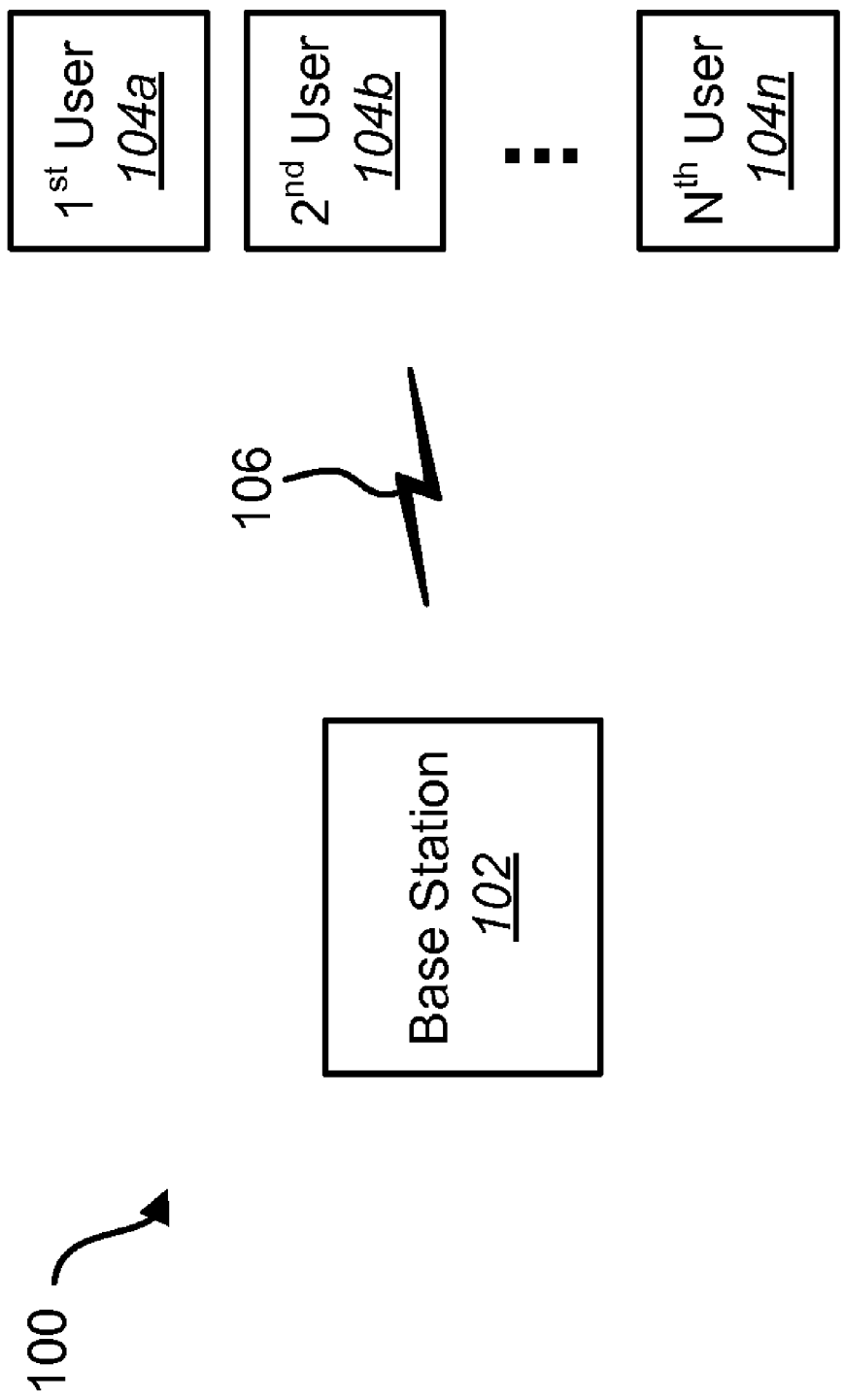
FIG. 1 illustrates an exemplary wireless communication system in which the present systems and methods may be practiced.

A method for generating a codebook to encode embedded information is described. A distribution pattern of symbols is determined. A first number of codewords associated with the distribution pattern of symbols is determined. A subset of codewords is selected from the first number of codewords. The subset of codewords is included in the codebook if the subset of codewords satisfies predetermined performance criteria.

In one example, a second number of codewords is calculated. The second number may indicate the quantity of codewords to include in the codebook. Possible combinations of codewords may be calculated based on the first number of codewords and the second number of codewords. A performance metric for each of the possible combinations of codewords may be calculated.

A determination may be made as to whether a performance metric of a combination of codewords is better than the performance metric of other combinations of codewords. Codewords associated with a combination may be included if the combination's performance metric is better than the performance metrics of other combinations.

The performance criteria may include a minimum average Euclidean distance among the codewords of the subset of codewords. The performance criteria may include a minimum average Hamming distance among the codewords of the subset of codewords. The performance criteria may also include a maximum of the smallest Hamming distance among the codewords of the subset of codewords. The performance criteria may further include a maximum of the smallest Euclidean distance among the codewords of the subset of codewords.

In one configuration, an initial value of a codebook B may be selected and an initial value of a codebook B* may be selected. B* may be selected based on the value B. A set of codewords may be determined. The sum distance of the codewords to the codebook B* may be smaller than the sum distance of other sets of codewords to the codebook B*. In one example, a new independent value $B_{new}$ may be generated.

A first performance criteria $P(B_{new})$ and a second performance criteria $P(B_i)$ may be calculated. In one configuration, $B_{i+1}$ is set equal to $B_{new}$ if performance criteria are met. A condition to terminate the generation of the codebook may also be set.

A communications device that is configured to generate a codebook to encode embedded information is also described. The communications device includes a processor and memory in electronic communication with the processor. Instructions are stored in the memory. The instructions are executable to determine a distribution pattern of symbols and determine a first number of codewords associated with the distribution pattern of symbols. The instructions are further executable to select a subset of codewords from the first number of codewords and include the subset of codewords in the codebook if the subset of codewords satisfies predetermined performance criteria.

A computer-readable medium comprising executable instructions is also described. The instructions are executable for determining a distribution pattern of symbols and determining a first number of codewords associated with the distribution pattern of symbols. The instructions are further executable for selecting a subset of codewords from the first number of codewords and including the subset of codewords in the codebook if the subset of codewords satisfies predetermined performance criteria.

The present systems and methods describe algorithms used to generate a codebook that may be utilized to embed one type of information into the coding of another type of information. In one example, a first message of a first information type is embedded in the coding of a second message of a second information type. For example, the first message may be embedded in the codeword that is used to encode the second message.

As used herein, the term "information type" refers to a type of signal that may be transmitted and/or received. The term "message" refers to the string of bits for each information type. Examples of information type may include a channel quality indicator (CQI), an acknowledgment/non-acknowledgment (ACK/NACK), a pre-coding matrix indicator (PMI), etc. The present systems and methods may be implemented for additional types of information as well.

The desired quality for each of the multiple types of information may be different. In one example, the desired quality is a function of a message error rate and delay. Examples of different information types include channel quality indicator (CQI) information and acknowledgment/non-acknowledgment (ACK/NACK) information.

Typically, each message of different types of information are encoded separately and multiplexed in a Time Division Multiplex (TDM) fashion. Following the example above, the message for CQI information and the message for ACK/NACK information may be placed in different time slots of a sequence. An advantage of this typical approach is greater control of the CQI and the ACK/NACK target qualities. However, coding these messages separately may cause a communications link to perform worse than a communications link that includes joint coding of the CQI and the ACK/NACK.

Jointly coding messages for multiple types of information involves multiplexing the messages together as a single type of information. An advantage of jointly coding is an improvement in performance. However, each type of message may have the same error target quality, which may not be desired. In other words, channel resources may be used inefficiently by overprotecting messages of one or more types of information. Conversely, insufficient channel resources may be used resulting in under protection of messages of one or more of the types of information.

Embedding a message for one type of information into the coding of a message for another type of information provides unequal error protection to each of the information types. In one example, embedded coding is implemented in the design of uplink control signaling in a cellular system. The present systems and methods provide an algorithm for generating codebooks to embed a message of a first information type into the coding of a message of a second information type.

FIG. 1 illustrates an exemplary wireless communication system 100 in which the present systems and methods may be practiced. A base station 102 is in wireless communication with a plurality of user devices 104 (which may also be referred to as user equipment, mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "transmitter" refers to any component or device that transmits signals. A transmitter may be implemented in a base station 102 that transmits signals to one or more user devices 104. Alternatively, a transmitter may be implemented in a user device 104 that transmits signals to one or more base stations 102.

The term "receiver" refers to any component or device that receives signals. A receiver may be implemented in a user device 104 that receives signals from one or more base stations 102. Alternatively, a receiver may be implemented in a base station 102 that receives signals from one or more user devices 104.

The communications system 100 may be an Orthogonal Frequency Division Multiplexing (OFDM) system. In addition, the system 100 may be a Code Division Multiple Access (CDMA) system, a Time Division Multiple Access (TDMA) system, a Frequency Division Multiple Access (FDMA) system, a Wideband Code Division Multiple Access (W-CDMA) system, etc.

Figure 2:
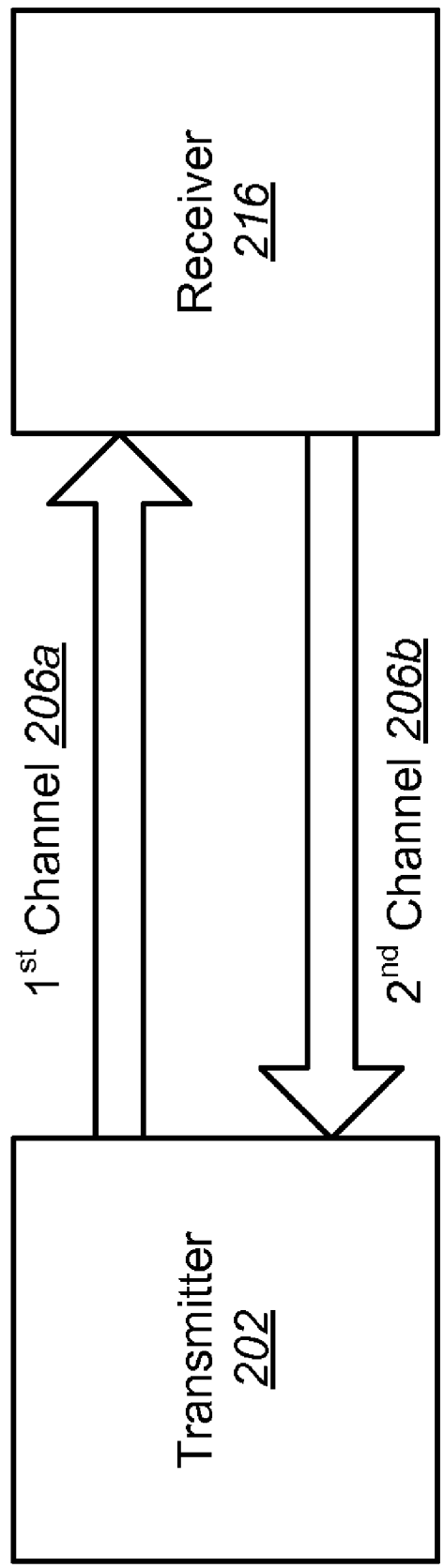
FIG. 2 illustrates communication channels that may exist between a transmitter and a receiver.

FIG. 2 illustrates communication channels 206 that may exist between a transmitter 202 and a receiver 216. As shown, communication from the transmitter 202 to the receiver 216 may occur over a first communication channel 206a. Communication from the receiver 216 to the transmitter 202 may occur over a second communication channel 206b.

The first communication channel 206a and the second communication channel 206b may be separate communication channels 206. For example, there may be no overlap between the transmission band of the first communication channel 206a and the transmission band of the second communication channel 206b. The first communication channel 206a may also be referred to as a downlink, forward link, etc. The second communication channel 206b may be referred to as an uplink, reverse link, etc.

Figure 3:
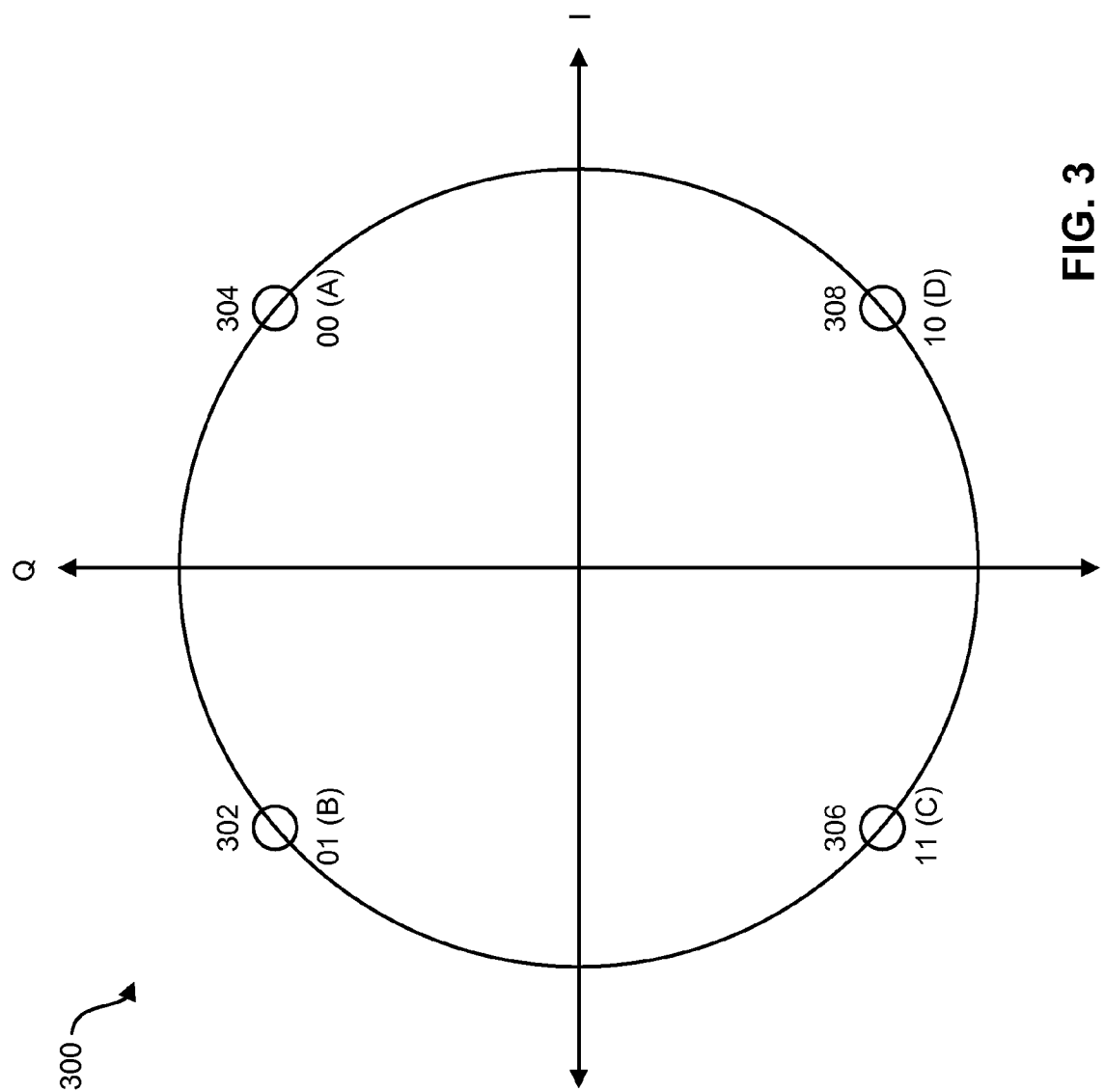
FIG. 3 is one embodiment of a constellation diagram for Quadrature Phase Shift Keying (QPSK) modulation.

FIG. 3 is one embodiment of a constellation diagram 300 for Quadrature Phase Shift Keying (QPSK) modulation, which may be implemented with the present systems and methods. QPSK modulation may use four points 302, 304, 306, 308 on the constellation diagram 300, equispaced around a circle. With four points 302, 304, 306 and 308, QPSK modulation may encode two bits of a message into a symbol. For example, a message may include the bits "01". These bits may be encoded as the symbol "B". In a similar manner, the bits "00" may be encoded as the symbol "A", the bits "11" may be encoded as the symbol "C" and the bits "10" may be encoded as the symbol "D".

Figure 4:
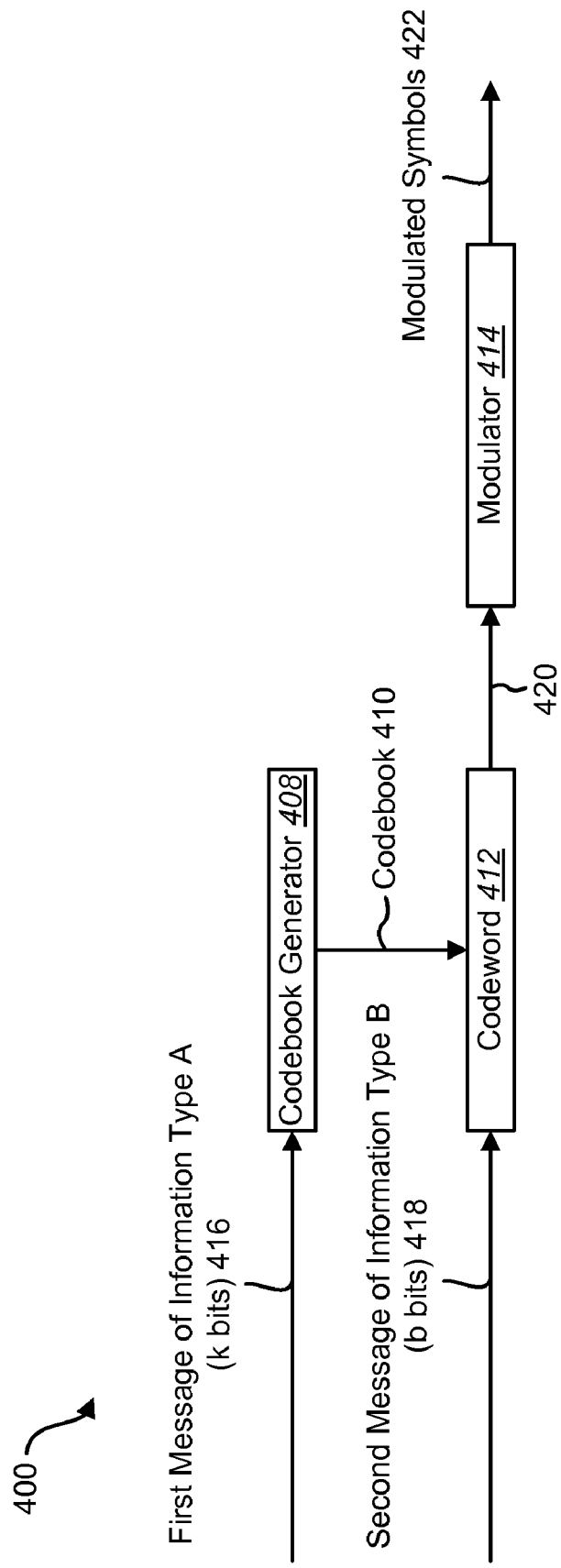
FIG. 4 is an example of a method for embedding a first message of information type A into the coding of a second message of information type B.

FIG. 4 is an example of a method 400 for embedding a first message of information type A 416 into the coding of a second message of information type B 418. The method 400 may be implemented on a user device 104. The first message 416 may include k bits and the second message 418 may include b bits.

In one example, the first message of information type A 416 may be an ACK/NACK. If the first message 416 is an ACK/NACK, k may equal two. As such, the first message 416 may be "00", "01", "10" or "11". In one configuration, the second message of information type B 418 may be a CQI. As such, the number of bits (b) of the second message 418 may be eight.

A codebook generator 408 may generate a codebook 410 associated with messages of information type B. The codebook 410 may be generated based on the value of the first message 416. As used herein, the term "codeword" refers to a set of bits (m bits) that become a sequence of symbols (n symbols). The sequence of symbols may be assembled in accordance with specific rules and assigned a unique meaning. A codeword may be represented as "$c_i$". Each codeword may correspond to one information string of w bits and may be used to encode a message. The term "codebook" may refer to a set of codewords which may be in the form of a lookup table. A codebook may be represented as B. As such, $B=\{c_1, \ldots, c_Q\}$ where $Q=2^w$.

In one configuration, a first codebook with a first set of codewords may be generated if the first message 416 is "00". A second codebook with a second set of codewords may be generated if the first message 416 is "01", etc. The codeword 412 may be an m bit codeword. In one example, the codeword 412 may be a 20-bit codeword. Details regarding the generation of the codebook 410 will be further discussed below.

In one example, an encoded second message 420 (i.e., the codeword 412) may be modulated by a modulator 414 to become n modulated symbols 422, where n depends on the modulation scheme used. In one configuration, the modulated symbols 422 are produced from the QPSK modulation scheme. The symbols 422 may be a combination of the symbols A 304, B 302, C 306 and D 308 from FIG. 3. The modulated symbols 422 may be inserted into time slots of a sequence and transmitted to a receiver.

The following example further illustrates the method 400 for embedding a first message 416 (such as an ACK/NACK) into the coding of a second message 418 (such as a CQI). The first message 416 may have the value of "00" (where k=2). The second message 418 may have the value of "00000000" (where w=8). The codebook generator 408 generates a codebook 410 to encode the second message 418. The codebook 410 may be based on the value of the first message 416 (e.g, "00"). The generated codebook 410 may include $2^w$ codewords (e.g., $2^8=256$ codewords). One of the $2^w$ codewords is selected to encode the second message 418. The encoded second message 420 (i.e., the codeword 412) is modulated by a modulator 414 to become the modulated symbols 422.

Because the value of the first message 416 in this example is "00", the generated codebook 410 may include codewords that produce the A symbol 304 more than the other symbols after modulation. In other words, based on the QPSK constellation diagram 300, the modulated symbols 422 may include more occurrences of the A 304 symbol than any other symbol. To further explain, codewords within the codebook 410 may include more occurrences of the combination "00" than the combinations "01", "10" or "11". When a codeword is modulated, the combinations "00" may be represented by the A 304 symbol. The combinations "01", "10" and "11" may be represented by the B 302 symbol, the D 308 symbol and the C 306 symbol, respectively. Table 1 shows an example of a codebook 410 that may be used to encode the second message 418 (such as the CQI) when the first message 416 (such as the ACK/NACK) has the value "00".

TABLE 1

Example codebook when first message is "00"

| Second Message (w bits) | Codeword (m bits) | Distribution of Symbols |
|---|---|---|
| 00000000 | 00000000000000011110 | AAAAAAABCD |
| ... | ... | ... |
| 11111111 | 10000000000001110000 | DAAAAABCAA |

In a similar manner, a codebook with different codewords may be generated when the first message 416 is "01", "11" or "10". These codebooks may include codewords that produce more occurrences of the B 302 symbol, the C 306 symbol or the D 308 symbol after modulation, depending on the value of the first message. Table 2 shows an example of how the modulated symbols 422 may be distributed depending on the value of the first message 416.

TABLE 2

Examples of Symbol Distributions

| First Message (k bits) | Distribution of Symbols |
|---|---|
| 00 | 7A, 1B, 1C, 1D |
| 01 | 1A, 7B, 1C, 1D |
| 11 | 1A, 1B, 7C, 1D |
| 10 | 1A, 1B, 1C, 7D |

Figure 5:
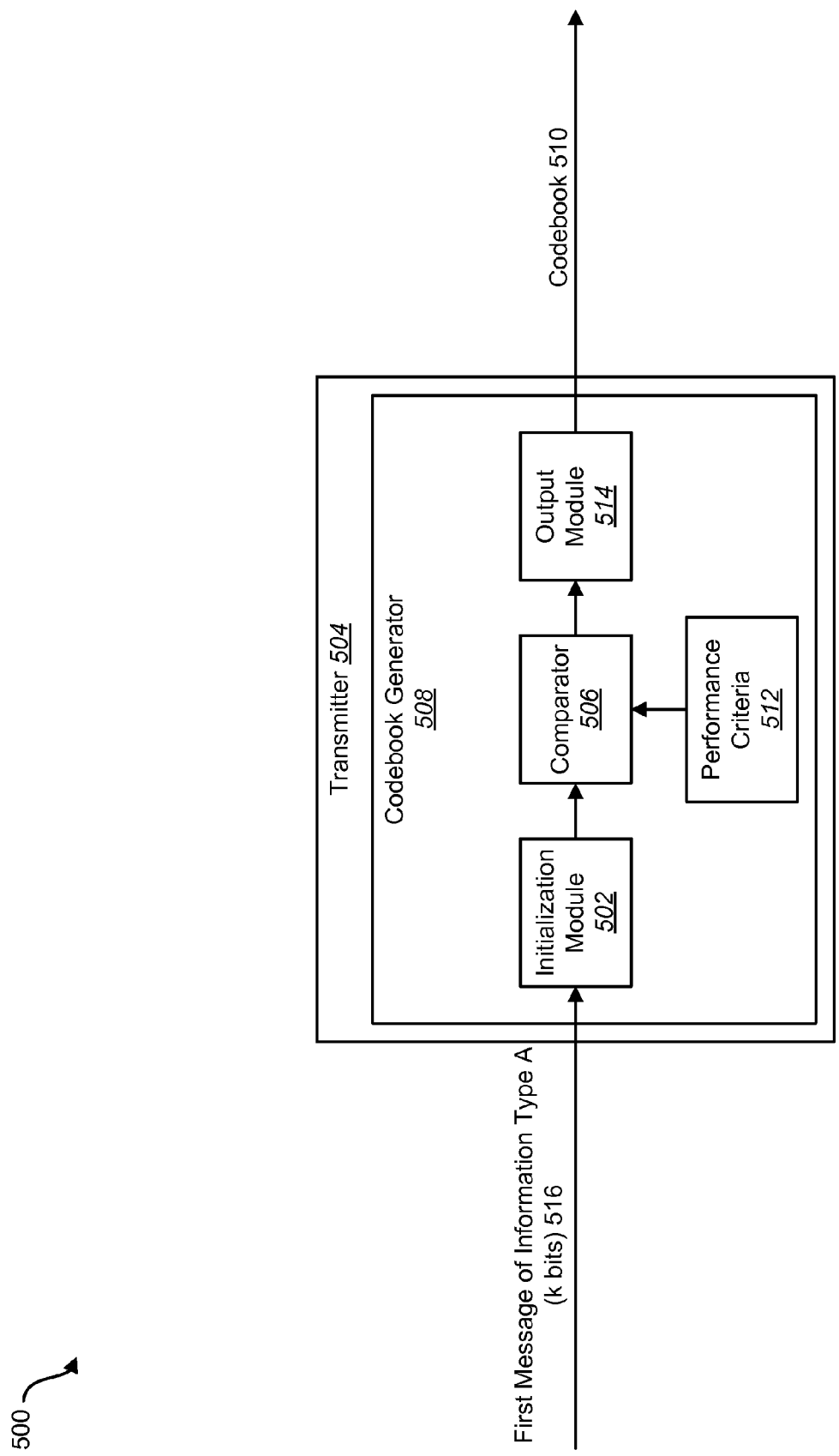
FIG. 5 is a block diagram illustrating one example of a transmitter that includes a codebook generator.

FIG. 5 is a block diagram illustrating one example of a transmitter 504 that includes a codebook generator 508. The codebook generator 508 may be used to generate a codebook 510 that includes codewords. The codewords may be utilized to encode a message that conveys a particular type of information. In one configuration, a codeword from the generated codebook 510 may be used to encode a CQI message.

In one example, a first message of information type A 516 may be received by the codebook generator 508. The first message 516 may be an ACK/NACK. In addition, the first message 516 may include k bits, where k may equal two. An initialization module 502 receives the first message 516 and initializes the generation of the codebook 510. The initialization module 502 may provide possible codewords to be included in the codebook 510 to a comparator 506. The possible codewords are each associated with a sequence of symbols. The comparator 506 compares the sequence of symbols for a codeword with performance criteria P(B) 512. Based on the results of the comparison, a codeword may be included in the codeword 510. An output module 514 may output the generated codebook 510 that includes codewords whose sequence of symbols satisfied the performance criteria 512.

In one example, a Hamming distance for hard decision decoding and a Euclidean distance for soft decision decoding provide two possible performance criteria 512. The Hamming distance may be the number of positions for which corresponding symbols are different between two codewords of equal lengths. The Hamming distance may be represented as h. In one example, $h_{ij}$ may represent the Hamming distance between a first codeword ($c_i$) and a second codeword ($c_j$). The Euclidean distance may be the distance between two codewords of equal lengths. The Euclidean distance may be represented as e. In one configuration, $e_{ij}$ may represent the Euclidean distance between the first codeword ($c_i$) and the second codeword ($c_j$).

Multiple performance criteria P(B) 512 may be used when selecting codewords to be included in the codebook 510. A first example of performance criteria P(B) 512 may include minimizing the average Euclidean distance among the codewords. This may be represented as:

$$\arg\min_B \frac{1}{Q} \sum_i \sum_{j \neq i} e_{ij}, \, i, j \in \{1, \ldots, Q\} \quad \text{Criteria 1}$$

A second example of performance criteria P(B) 512 may include minimizing the average Hamming distance among the code words. The second example may be represented as:

$$\arg\min_B \frac{1}{Q} \sum_i \sum_{j \neq i} h_{ij}, \, i, j \in \{1, \ldots, Q\} \quad \text{Criteria 2}$$

A third example of performance criteria P(B) 512 may include maximizing the smallest Euclidean distance among the code words. The third example may be represented as:

$$\arg\max_B (\min e_{ij}), \, \forall \, i, j \in \{1, \ldots, Q\} \quad \text{Criteria 3}$$

In addition, a fourth example of performance criteria P(B) 512 may include maximizing the smallest Hamming distance among the codewords. The fourth example may be represented as:

$$\arg\max_B (\min h_{ij}), \, \forall \, i, j \in \{1, \ldots, Q\} \quad \text{Criteria 4}$$

Figure 6:
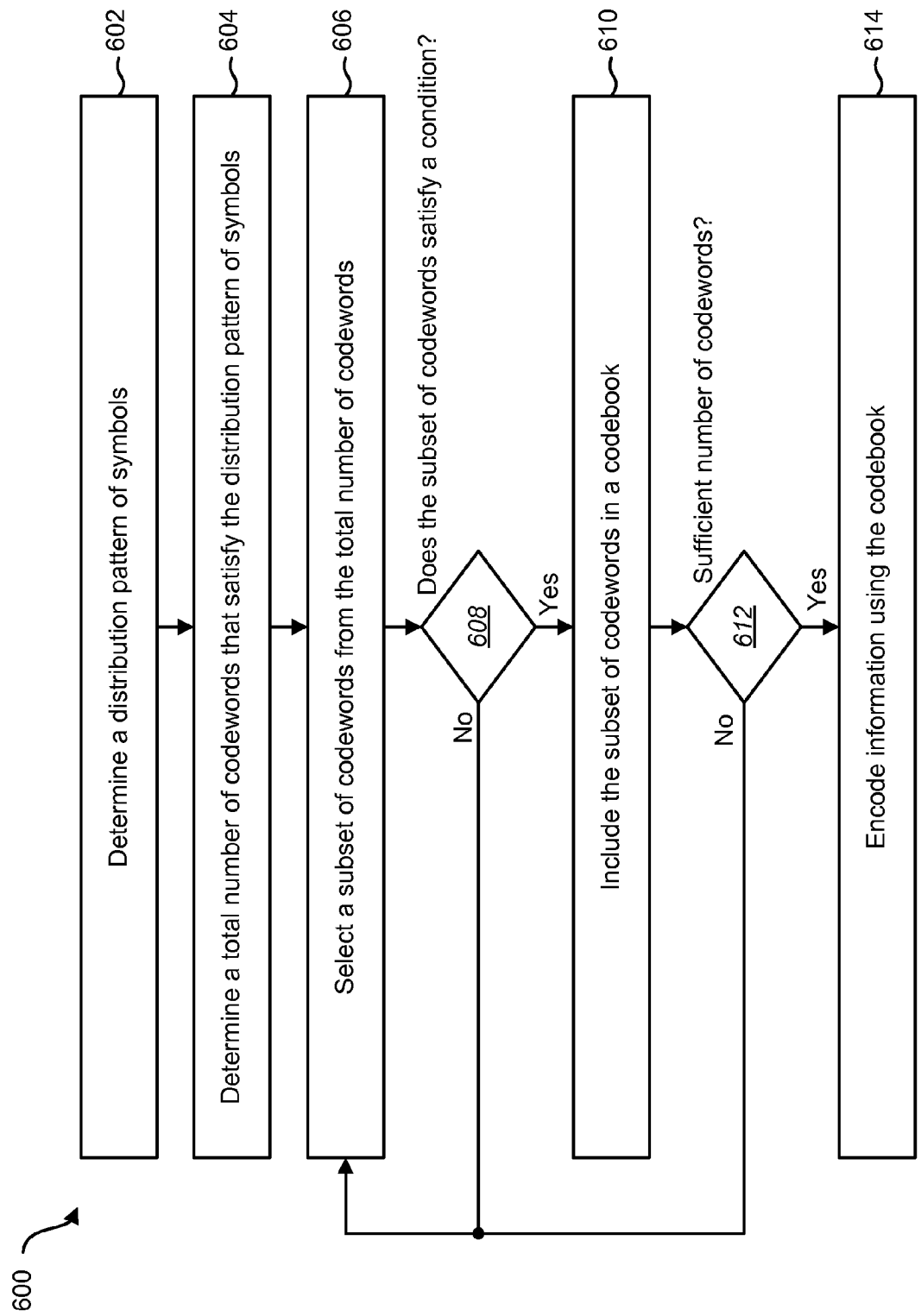
FIG. 6 is a flow diagram illustrating one example of a method for generating a codebook that may be utilized for embedded coding of information.

FIG. 6 is a flow diagram illustrating one example of a method 600 for generating a codebook that may be utilized for embedded coding of information. In one configuration, the method 600 may be implemented by a user device 104. A distribution pattern of symbols may be determined 602. The symbols may be associated with QPSK modulation schemes as described in FIG. 3. The distribution pattern may be determined 602 based on the first message of information type A 516 (e.g., an ACK/NACK message).

In one example, a total number of codewords that satisfy the distribution pattern of symbols is determined 604. A subset of codewords from the total number of codewords is selected 606 and a determination 608 is made as to whether or not the codewords of the subset satisfy a condition. In one configuration, the condition is one or more of the performance criteria P(B) 512 previously described. If it is determined 608 that the subset of codewords does not satisfy a condition, the method 600 returns to select 606 a different subset of codewords. However, if the codewords of the subset satisfy the condition, the subset of codewords is included 610 in the codebook.

In one example, a determination 612 is made as to whether or not the codebook includes a sufficient number of codewords. If the codebook does not include a sufficient number of codewords, a different subset of codewords may be selected 606. If it is determined that the codebook includes a sufficient number of codewords, information may be encoded 614 using the codebook. In particular, the codebook may be used to embed one type of information into another type of information as previously described.

Figure 7:
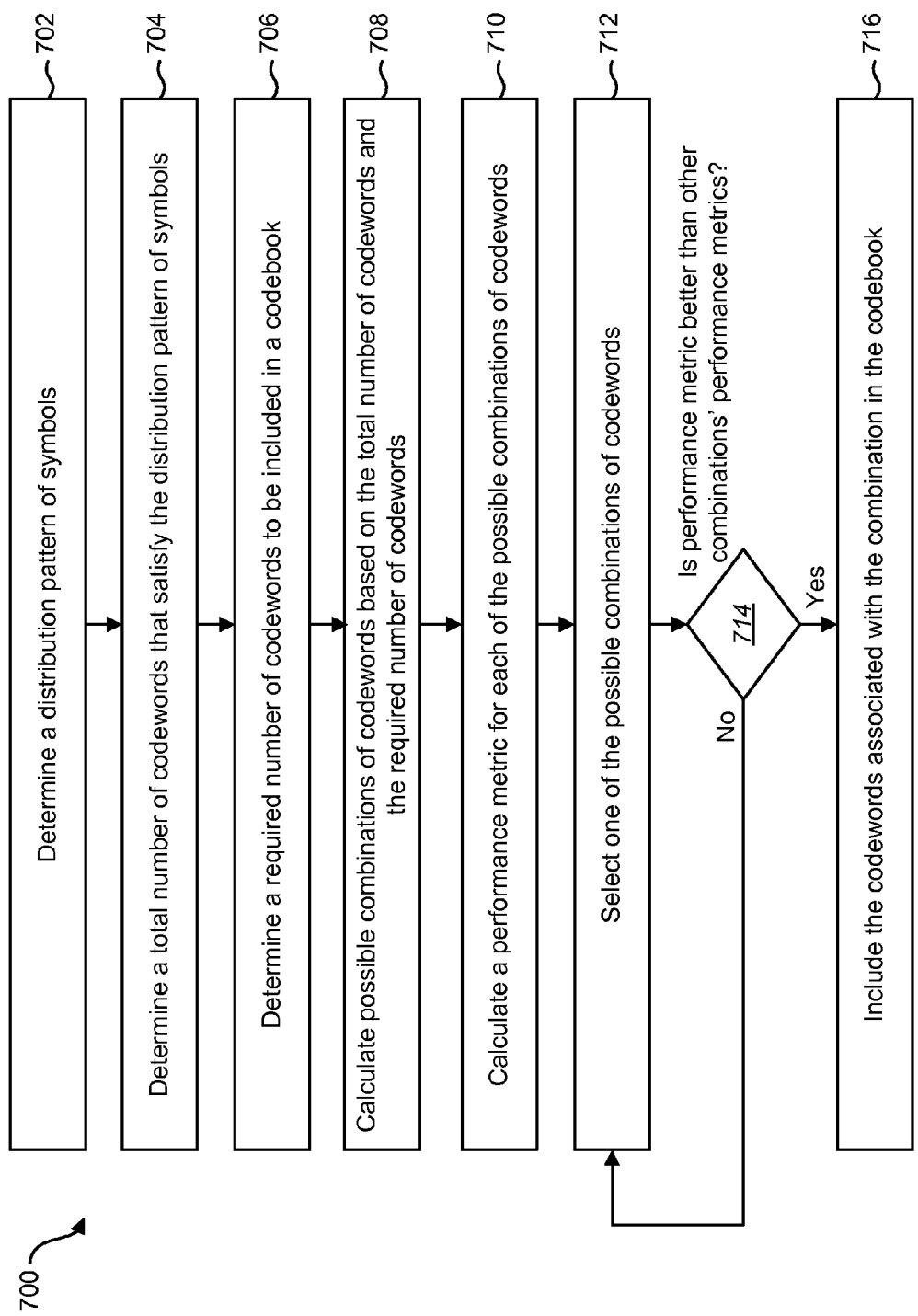
FIG. 7 is a flow diagram illustrating one example of a method for generating a codebook by selecting codewords to be included in the codebook.

FIG. 7 is a flow diagram illustrating one example of a method 700 for generating a codebook by selecting codewords to be included in the codebook. In one example, a distribution pattern of symbols is determined 702. For example, QPSK modulation schemes may be implemented and a distribution pattern of "3A 1B 0C 1D" may be determined 702. The number of bits associated with the first message 416 and the second message 418 may be k=1 and w=4, respectively. In addition, the number of symbols (n) may be n=5.

All the codewords that satisfy the distribution pattern of symbols may be determined 704. The total number of codewords may be represented as S. Using the above example, the total number of codewords (S) that would satisfy the distribution of "3A 1B 0C 1D" may be $$\binom{5}{3} \times \binom{2}{1} = 20.$$

In addition, a required number of codewords to include in a codebook is also determined 706. The required number of codewords may be determined by calculating $2^w$. For example, since w=4 in the above example, $2^4=16$ codewords out of the 20 codewords may be required to be included in the codebook.

In one configuration, possible combinations of codewords are calculated 708. The possible combinations may be based on the total number of codewords and the required number of codewords. For example, the possible combinations may be $$\binom{20}{16} = 4845.$$

A performance metric may be calculated 710 for each of the possible combinations. In one example, the performance metric may be selected as the average Euclidean distance among the codewords associated with a combination if criteria 1 (referenced above) is used.

A possible combination of codewords may be selected 712. In one example, a determination 714 may be made as to whether the performance metric of the selected combination is better than the performance metrics of other combinations. If the performance metric of the selected combination is not better, the method 700 may return to select 712 a different combination of codewords. However, if the performance metric of the selected combination is better than the performance metrics of other combinations, the codeword(s) associated with the combination may be included 716 in the codebook.

Figure 8:
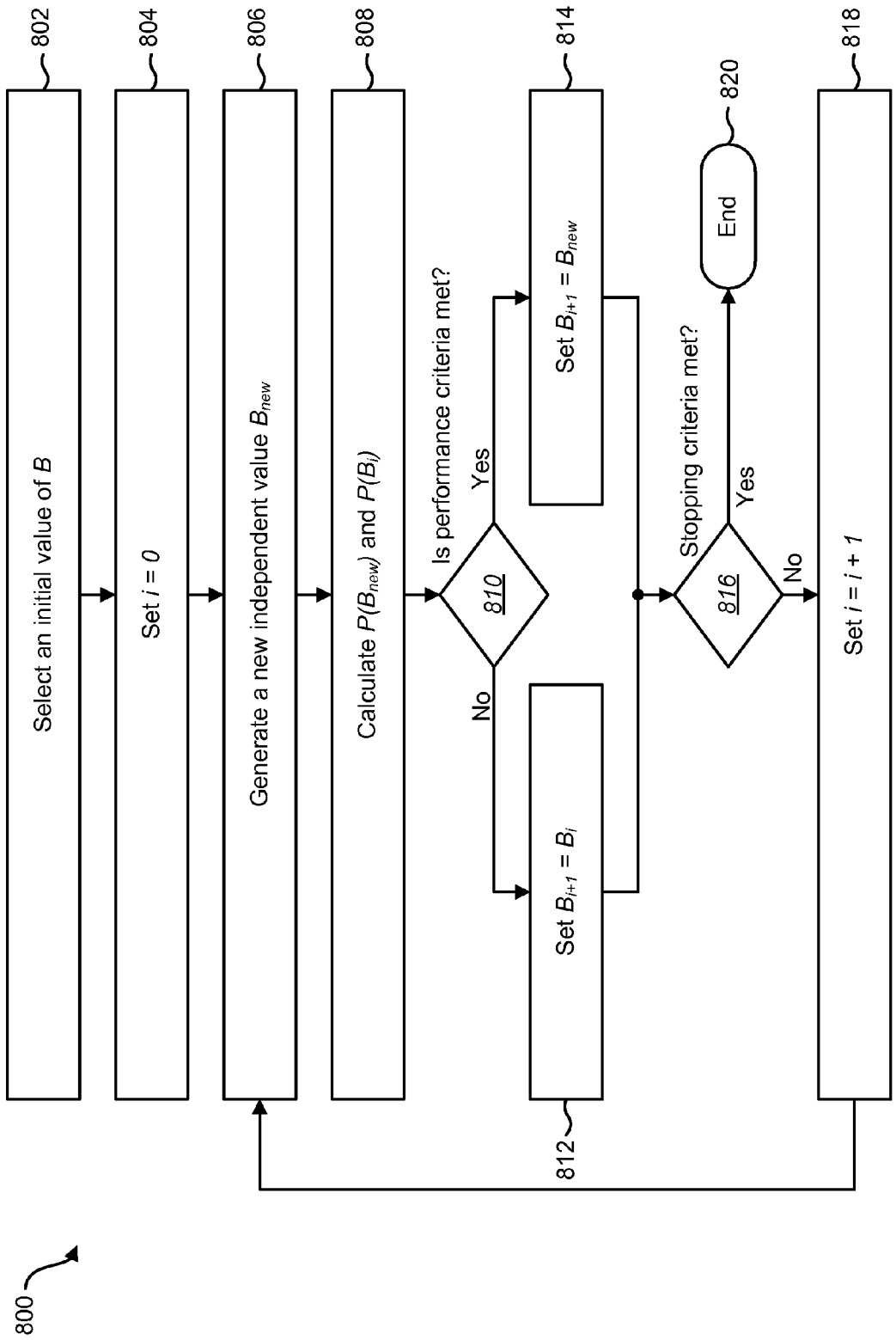
FIG. 8 is a flow diagram illustrating another example of a method for generating a codebook that may be used for embedded coding.

FIG. 8 is a flow diagram illustrating another example of a method 800 for generating a codebook that may be used for embedded coding. In one example, an initial value of B may be selected 802. The value B may represent a codebook. In one example, the selected value of B may be $B_0 \in S$ (where S represents the total number of codewords that could satisfy a determined distribution pattern of symbols). The initial value of B may be selected 802 randomly or deterministically. If the value of B is selected 802 randomly, a uniform distribution on S may be implemented.

In one example, a counter value i may be set 804 to zero. A new independent value for B may be generated 806. For example, the new value may be $B_{new} \in S$ according to a chosen probability distribution. In one configuration, $P(B_{new})$ and $P(B_i)$ may be calculated 808. A determination 810 may be made as to whether or not a performance criterion is met. For example, if $P(B_{new}) < P(B_i)$ for criteria 1 and criteria 2 (referenced above) (or if $P(B_{new}) > P(B_i)$ for criteria 3 and criteria 4), $B_{i+1}$ may be set 814 equal to $B_{new}$. However, if the performance criteria are not met $B_{i+1}$ may be set 812 equal to $B_i$.

A determination 816 may also be made as to whether a stopping criteria is met. The stopping criteria may indicate the conditions to stop executing an algorithm to select codewords to generate a codebook. The stopping criteria may include a threshold. Examples of a threshold may be a number of trials T and the difference between the performance metrics of two trials (r). The stopping criteria may further include a maximum number of evaluations L. If it is determined 816 that the maximum number of evaluations L has been reached, or the threshold $r < P(B_{i+1}) - P(B_i)$ is satisfied with the current estimate for B, the method 800 ends 820. However, if the stopping criteria are not met, i may be set 818 to i+1 and the method 800 returns to generate 806 a new independent value $B_{new}$.

The following example further illustrates one example of the method 800. In one configuration, k=2, w=8 and n=10. QPSK modulation may be utilized and the required symbol distribution may be "7A 1B 1C 1D". The total number of codewords that satisfy this symbol distribution may be $$\binom{10}{7} \times \binom{3}{1} \times \binom{2}{1} = 720.$$

Since w=8, $2^8$ codewords (i.e., 256 codewords) out of the 720 codewords may become the codebook. A total of $$\binom{720}{256}$$

possible combinations of codewords may exist. The maximum number of evaluations L may be 50,000. In each trial, 256 codewords may be randomly chosen to be the codebook B and P(B) may be calculated. After 50,000 trials, the resultant codebook of the method 800 described hereinabove is determined as the final codebook B.

Figure 9:
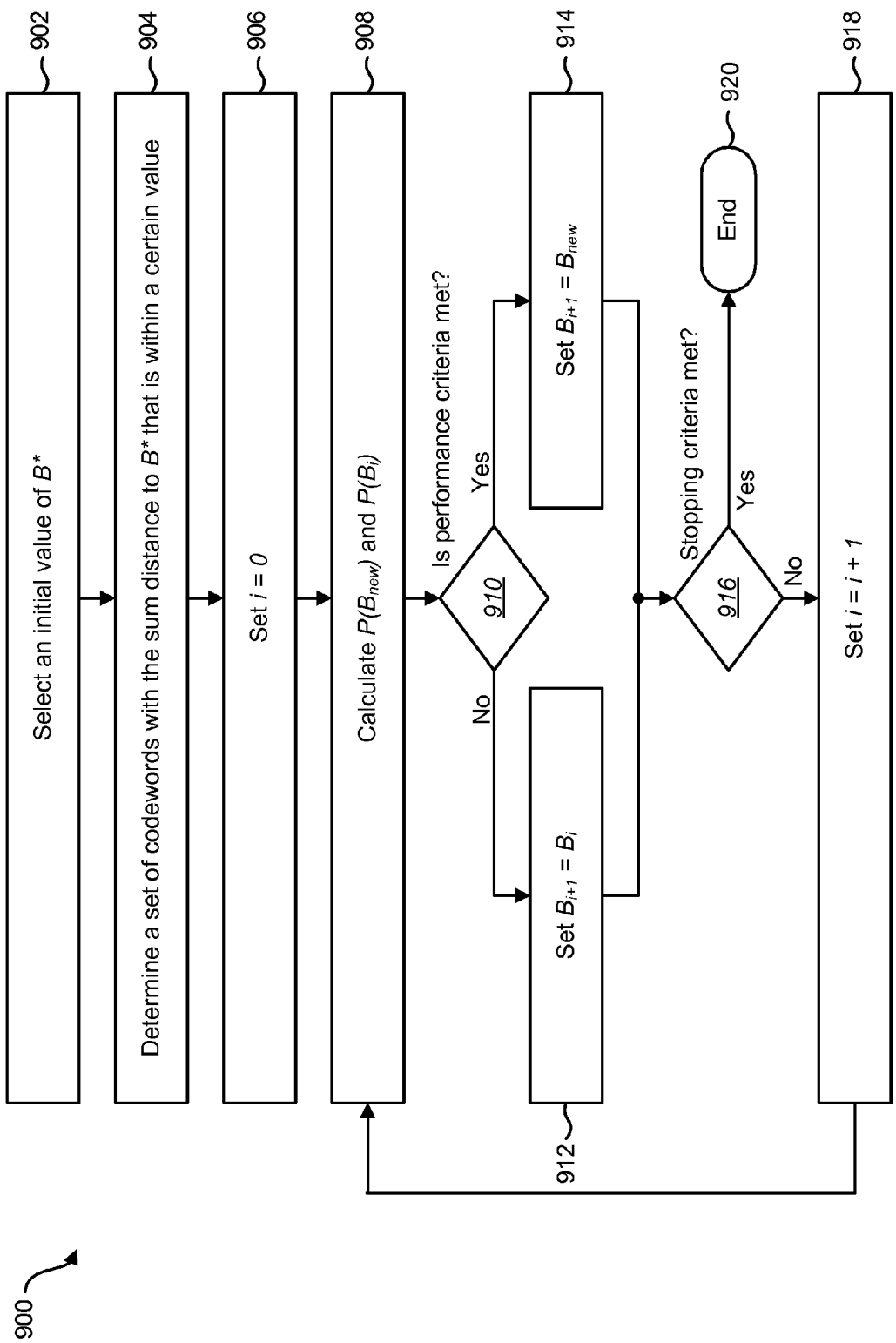
FIG. 9 is a flow diagram illustrating a further example of a method for generating a codebook.

FIG. 9 is a flow diagram illustrating a further example of a method 900 for generating a codebook. The method 900 may apply heuristic optimization on top of the results generated from the method 800 described in FIG. 8. Similar to the method 800, a threshold may be defined. Two possible candidate thresholds include a number of trials T and the difference between the performance metrics of two trials (r). An initial value of B* may be selected 902. In one example, the resulting B from the method 800 may be selected, for example $B^* \in S$. A set of codewords that produce a sum distance to B* that is within a certain value may be determined 904. For example, a set of codewords $c_X$, $X = \{x_1, \ldots, x_Y\}$ is determined 904 such that their sum distance to the codebook B* is the smallest, $$\sum_{x=x_1}^{xY} \sum_{j=1, j \neq x}^{Q} e_{xj} < \sum_{p=p_1}^{pY} \sum_{j=1, j \neq p}^{Q} e_{pj},$$

$\forall x \in X$, $\forall p \in P \subseteq B^* - X$ (or $$\sum_{x=x_1}^{xY} \sum_{j=1, j \neq x}^{Q} h_{xj} < \sum_{p=p_1}^{pY} \sum_{j=1, j \neq p}^{Q} h_{pj},$$

$\forall x \in X$, $\forall p \in B^* - X$ if the Hamming distance is used). The set of codewords P may have the same size as X. A counter value i may be set 906 to zero and P(B*) may be calculated. In addition, a value $B_{new}$ may be generated by replacing $c_X$ with $c_i$, where $c_i$ may be the set of codewords choosing from $C = S - B^*$ to get a new value $B_{new} \in S$. In one example, $c_i$ includes the same number of codewords as $c_X$.

In one configuration, $P(B_{new})$ and $P(B_i)$ may be calculated 908. A determination 910 may be made as to whether or not performance criteria are met. If $P(B_{new}) < P(B_i)$ for performance criteria 1 and criteria 2 ($P(B_{new}) > P(B_i)$ for performance criteria 3 and criteria 4), set 914 $B_{i+1} = B_{new}$. However, if $P(B_{new}) < P(B_i)$ for performance criteria 1 and criteria 2 ($P(B_{new}) > P(B_i)$ is not satisfied for criteria 3 and criteria 4), set 912 $B_{i+1} = B_i$.

A determination 916 may be made as to whether stopping criteria are met. For example, the method 900 may end 920 if the maximum number of evaluations L has been reached or the threshold $r < P(B_{i+1}) - P(B_i)$ is satisfied with the current estimate for B. However, if it is determined 916 that the stopping criteria are not met, i may be set 918 to i+1. The method 900 may return to calculate 908 $P(B_{new})$ and $P(B_i)$.

The following example further illustrates one example of the method 900. In one configuration, k=2, w=8 and n=10. QPSK modulation may be utilized and the required symbol distribution may be "7A 1B 1C 1D". The total number of codewords that satisfy this symbol distribution may be $$\binom{10}{7} \times \binom{3}{1} \times \binom{2}{1} = 720.$$

Since w=8, $2^8$ codewords (i.e., 256 codewords) out of the 720 codewords may become the codebook. A total of $$\binom{720}{256}$$

possible combinations of codewords may exist. In this example, the result from the method 800 may be used as B*. In one example, Y may represent the number of codewords that are changed when $c_x$ is replaced with $c_i$. If Y=1, 464 trials may need to be searched through (i.e., 720−256=464). In one example, L may be selected to be 464. If Y=2, $$\binom{464}{2} = 107416 \text{ trials}$$

trials may be searched through. So if Y>=2, a large number for L may be defined to stop the algorithm early that generates codebooks.

Figure 10:
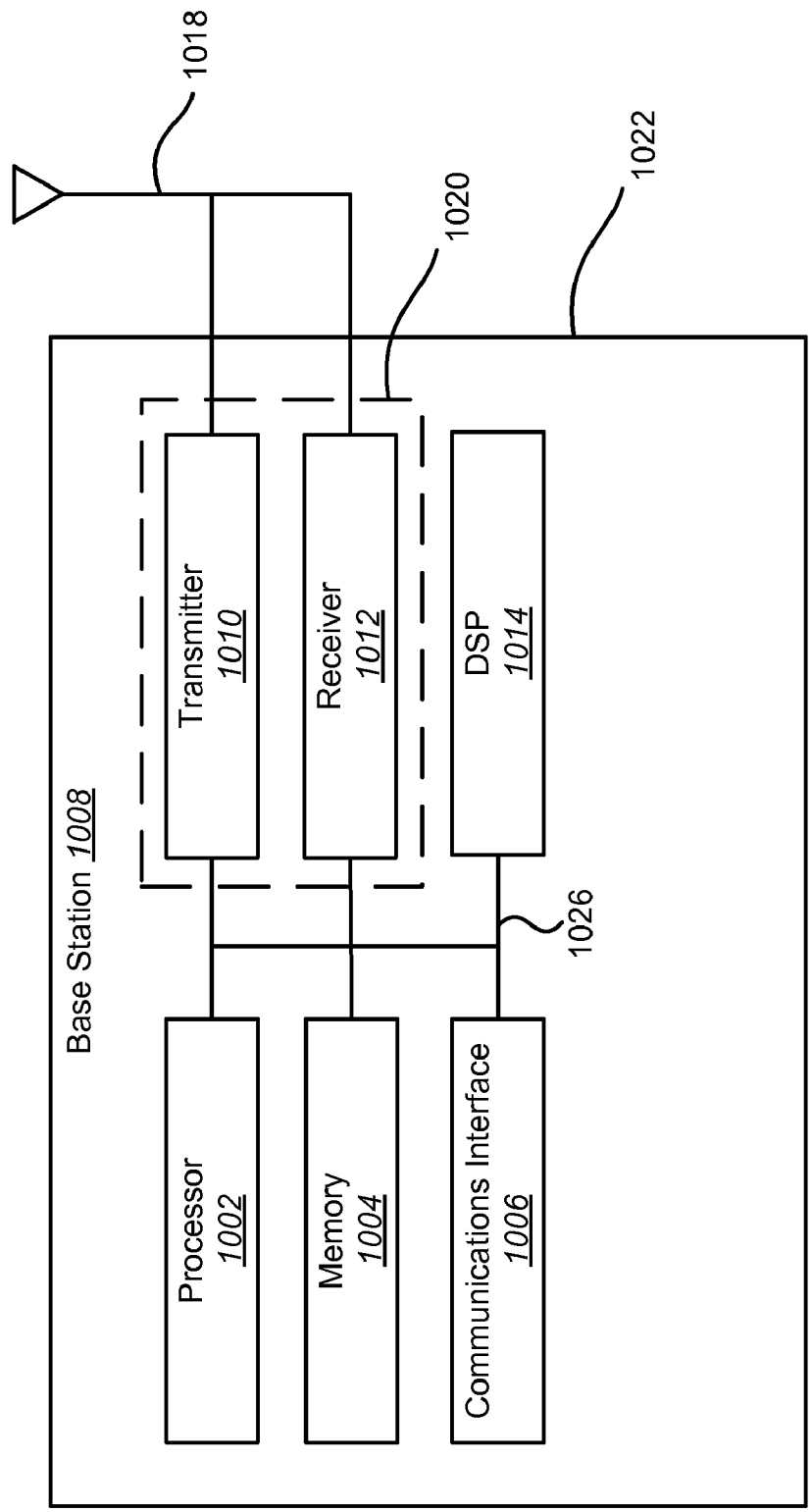
FIG. 10 is a block diagram of a base station in accordance with one example of the disclosed apparatus.

FIG. 10 is a block diagram of a base station 1008 in accordance with one example of the disclosed apparatus. One or more base stations 1008 may be used to implement the various systems and methods disclosed herein. The base station 1008 may be a base station controller, a base station transceiver, etc. The base station 1008 includes a transceiver 1020 that includes a transmitter 1010 and a receiver 1012. The transceiver 1020 may be coupled to an antenna 1018. The base station 1008 further includes a digital signal processor (DSP) 1014, a general purpose processor 1002, a memory 1004, and a communication interface 1006. The various components of the base station 1008 may be included within a housing 1022.

The processor 1002 may control operation of the base station 1008. The processor 1002 may also be referred to as a CPU. The memory 1004, which may include both read-only memory (ROM) and random access memory (RAM), provides instructions and data to the processor 1002. A portion of the memory 1004 may also include non-volatile random access memory (NVRAM).

Figure 11:
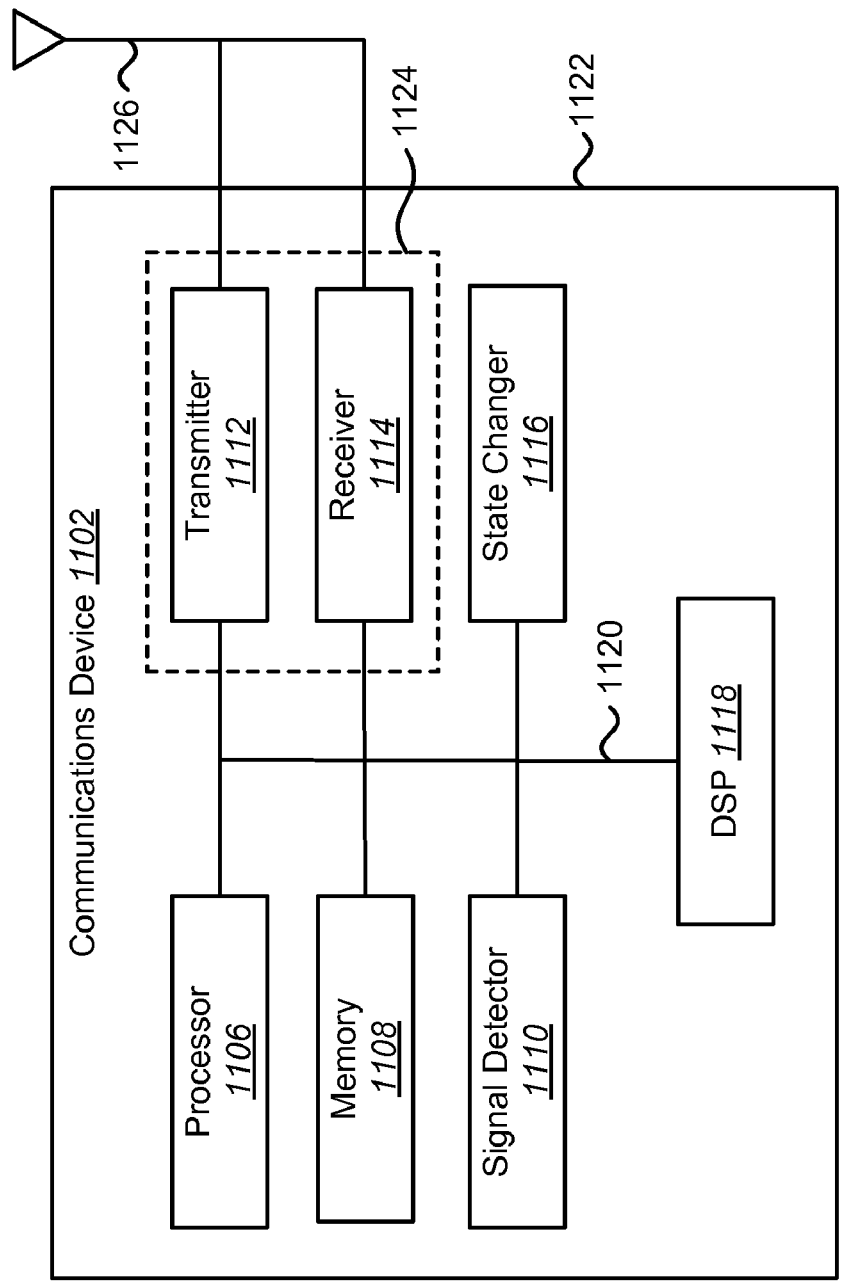
FIG. 11 illustrates various components that may be utilized in a communications device.

FIG. 11 illustrates various components that may be utilized in a communications device 1102. The communications device 1102 may include any type of communications device such as a mobile station, a cell phone, an access terminal, user equipment, etc. The communications device 1102 includes a processor 1106 which controls operation of the communications device 1102. The processor 1106 may also be referred to as a CPU. Memory 1108, which may include both read-only memory (ROM) and random access memory (RAM), provides instructions and data to the processor 1106. A portion of the memory 1108 may also include non-volatile random access memory (NVRAM).

The communications device 1102 may also include a housing 1122 that contains a transmitter 1112 and a receiver 1114 to allow transmission and reception of data. The transmitter 1112 and receiver 1114 may be combined into a transceiver 1124. An antenna 1126 is attached to the housing 1122 and electrically coupled to the transceiver 1124. Additional antennas (not shown) may also be used.

The communications device 1102 may also include a signal detector 1110 used to detect and quantify the level of signals received by the transceiver 1124. The signal detector 1110 detects such signals as total energy, pilot energy, power spectral density, and other signals.

A state changer 1116 controls the state of the communications device 1102 based on a current state and additional signals received by the transceiver 1124 and detected by the signal detector 1110. The communications device 1102 may be capable of operating in any one of a number of states.

The various components of the communications device 1102 are coupled together by a bus system 1120 which may include a power bus, a control signal bus, and a status signal bus in addition to a data bus. However, for the sake of clarity, the various buses are illustrated in FIG. 11 as the bus system 1120. The communications device 1102 may also include a digital signal processor (DSP) 1118 for use in processing signals. The communications device 1102 illustrated in FIG. 11 is a functional block diagram rather than a listing of specific components.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for generating a codebook to encode embedded information, comprising:
   determining a distribution pattern of symbols;
   determining a first number of codewords associated with the distribution pattern of symbols;
   selecting a subset of codewords from the first number of codewords;
   including the subset of codewords in the codebook if the subset of codewords satisfies predetermined performance criteria; and
   calculating a second number of codewords, and wherein the second number indicates the quantity of codewords to include in the codebook.

2. The method of claim 1, further comprising calculating possible combinations of codewords based on the first number of codewords and the second number of codewords.

3. The method of claim 2, further comprising calculating a performance metric for each of the possible combinations of codewords.

4. The method of claim 3, further comprising determining if a performance metric of a combination of codewords is better than the performance metric of other combinations of codewords.

5. The method of claim 4, further comprising including codewords associated with a combination if the combination's performance metric is better than the performance metrics of other combinations.

6. A method for generating a codebook to encode embedded information, comprising:
   determining a distribution pattern of symbols;
   determining a first number of codewords associated with the distribution pattern of symbols, wherein the first number is a total number of codewords;
   selecting a subset of codewords from the first number of codewords; and
   including the subset of codewords in the codebook if the subset of codewords satisfies predetermined performance criteria;
   wherein the performance criteria comprises a minimum average Euclidean distance among the codewords of the subset of codewords.

7. The method of claim 6, wherein the performance criteria comprises a minimum average Hamming distance among the codewords of the subset of codewords.

8. The method of claim 7, wherein the performance criteria comprises a maximum of the smallest Hamming distance among the codewords of the subset of codewords.

9. The method of claim 6, wherein the performance criteria comprises a maximum of the smallest Euclidean distance among the codewords of the subset of codewords.

10. A method for generating a codebook to encode embedded information, comprising:
    determining a distribution pattern of symbols;
    determining a first number of codewords associated with the distribution pattern of symbols;
    selecting a subset of codewords from the first number of codewords;
    including the subset of codewords in the codebook if the subset of codewords satisfies predetermined performance criteria; and
    selecting an initial value of a codebook B and selecting an initial value of a codebook B*, and wherein B* is selected based on the value B.

11. The method of claim 10, further comprising determining a set of codewords wherein the sum distance of the codewords to the codebook B* is smaller than the sum distance of other sets of codewords to the codebook B*.

12. The method of claim 10, further comprising generating a new independent value $B_{new}$.

13. The method of claim 12, further comprising calculating a first performance criteria $P(B_{new})$ and a second performance criteria $P(B_i)$.

14. The method of claim 13, further comprising setting $B_{i+1}=B_{new}$ if performance criteria are met.

15. The method of claim 10, further comprising setting a condition to terminate the generation of the codebook.

16. A communications device that is configured to generate a codebook to encode embedded information, the communications device comprising:
    a processor;
    memory in electronic communication with the processor;
    instructions stored in the memory, the instructions being executable to:
      determine a distribution pattern of symbols;
      determine a first number of codewords associated with the distribution pattern of symbols, wherein the first number is a total number of codewords;
      select a subset of codewords from the first number of codewords; and
      include the subset of codewords in the codebook if the subset of codewords satisfies predetermined performance criteria.

17. The communications device of claim 16, wherein the performance criteria comprises a minimum average Euclidean distance among the codewords of the subset of codewords.

18. The communications device of claim 16, wherein the performance criteria comprises a minimum average Hamming distance among the codewords of the subset of codewords.

19. The communications device of claim 16, wherein the performance criteria comprises a maximum of the smallest Hamming distance among the codewords of the subset of codewords.

20. The communications device of claim 16, wherein the performance criteria comprises a maximum of the smallest Euclidean distance among the codewords of the subset of codewords.

21. The communications device of claim 16, wherein the device is a mobile user device.

22. The communications device of claim 16, wherein the device is a base station.

23. A communications device that is configured to generate a codebook to encode embedded information, the communications device comprising:
   a processor;
   memory in electronic communication with the processor;
   instructions stored in the memory, the instructions being executable to:
      determine a distribution pattern of symbols;
      determine a first number of codewords associated with the distribution pattern of symbols;
      select a subset of codewords from the first number of codewords;
      include the subset of codewords in the codebook if the subset of codewords satisfies predetermined performance criteria; and
      calculate a second number of codewords, and wherein the second number indicates the quantity of codewords to include in the codebook.

24. The communications device of claim 23, wherein the instructions are further executable to calculate possible combinations of codewords based on the first number of codewords and the second number of codewords.

25. The communications device of claim 24, wherein the instructions are further executable to calculate a performance metric for each of the possible combinations of codewords.

26. The communications device of claim 25, wherein the instructions are further executable to determine if a performance metric of a combination of codewords is better than the performance metric of other combinations of codewords.

27. The communications device of claim 26, wherein the instructions are further executable to include codewords associated with a combination if the combination's performance metric is better than the performance metrics of other combinations.

28. A communications device that is configured to generate a codebook to encode embedded information, the communications device comprising:
   a processor;
   memory in electronic communication with the processor;
   instructions stored in the memory, the instructions being executable to:
      determine a distribution pattern of symbols;
      determine a first number of codewords associated with the distribution pattern of symbols;
      select a subset of codewords from the first number of codewords;
      include the subset of codewords in the codebook if the subset of codewords satisfies predetermined performance criteria; and
      select an initial value of a codebook B and select an initial value of a codebook B*, and wherein B* is selected based on the value B.

29. The communications device of claim 28, wherein the instructions are further executable to determine a set of codewords wherein the sum distance of the codewords to the codebook B* is smaller than the sum distance of other sets of codewords to the codebook B*.

30. The communications device of claim 28, wherein the instructions are further executable to generate a new independent value $B_{new}$.

31. The communications device of claim 30, wherein the instructions are further executable to calculate a first performance criteria $P(B_{new})$ and a second performance criteria $P(B_i)$.

32. The communications device of claim 31, wherein the instructions are further executable to set $B_{i+1}=B_{new}$ if performance criteria are met.

33. The communications device of claim 28, wherein the instructions are further executable to set a condition to terminate the generation of the codebook.

34. A computer-readable medium comprising executable instructions for:
   determining a distribution pattern of symbols;
   determining a first number of codewords associated with the distribution pattern of symbols, wherein the first number is a total number of codewords;
   selecting a subset of codewords from the first number of codewords; and
   including the subset of codewords in the codebook if the subset of codewords satisfies predetermined performance criteria.

* * * * *